United States Patent
Ewald et al.

(10) Patent No.: US 8,573,118 B2
(45) Date of Patent: Nov. 5, 2013

(54) FOOD TRAY AND METHOD

(75) Inventors: Henry T. Ewald, Roselle, IL (US); Paul G. Simmons, Glen Ellyn, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 1470 days.

(21) Appl. No.: 11/906,726

(22) Filed: Oct. 3, 2007

(65) Prior Publication Data

US 2009/0090252 A1  Apr. 9, 2009

(51) Int. Cl.
  *B65D 6/40*  (2006.01)
  *B65D 90/02*  (2006.01)
(52) U.S. Cl.
  USPC .......... 99/450; 220/676; 220/745; 220/573.1; 220/913
(58) Field of Classification Search
  USPC ............ 99/450, 474, 480; 220/573.1, 592.28, 220/661, 676, 745, 913, DIG. 27
  See application file for complete search history.

(56) References Cited

U.S. PATENT DOCUMENTS

| | | | |
|---|---|---|---|
| 510,798 A * | 12/1893 | Kendall | 126/377.1 |
| 3,952,609 A | 4/1976 | Klemm | |
| 4,179,985 A | 12/1979 | Baker et al. | |
| 4,190,965 A | 3/1980 | Erickson | |
| 4,386,703 A | 6/1983 | Thompson et al. | |
| 5,028,761 A | 7/1991 | Oda et al. | |
| 5,505,122 A | 4/1996 | Gerrit | |
| 5,562,023 A * | 10/1996 | Harrison | 99/426 |
| 5,778,800 A * | 7/1998 | Liang | 108/50.11 |
| 5,880,434 A | 3/1999 | Pinnow et al. | |
| 6,175,099 B1 | 1/2001 | Shei et al. | |
| 6,182,559 B1 * | 2/2001 | Chiang | 99/340 |
| 6,262,394 B1 | 7/2001 | Shei et al. | |
| 6,412,403 B1 | 7/2002 | Veltrop | |
| 6,541,739 B2 | 4/2003 | Shei et al. | |
| 6,607,766 B2 | 8/2003 | Ewald et al. | |
| 6,612,124 B1 * | 9/2003 | Hatch et al. | 62/258 |
| 6,637,322 B2 | 10/2003 | Veltrop | |
| 6,878,391 B2 | 4/2005 | Veltrop | |
| 6,884,451 B2 | 4/2005 | Veltrop | |
| 7,089,850 B2 | 8/2006 | Lee et al. | |
| 7,227,102 B2 * | 6/2007 | Shei | 219/394 |
| 2004/0033297 A1 | 2/2004 | Lee et al. | |
| 2004/0208961 A1 | 10/2004 | Reckert et al. | |

* cited by examiner

*Primary Examiner* — Reginald L Alexander
(74) *Attorney, Agent, or Firm* — Ryndak & Suri LLP

(57) ABSTRACT

A food tray adapted for holding previously cooked food items is provided. The food tray has one or more sidewall structure openings to allow venting of the interior volume of the tray through the tray sidewall structure openings. The food tray allows food items contained in the volume of the food tray to be stored over an extended period of time at an elevated temperature without significant deleterious effects to the appearance, taste and texture of the food. The food tray may also include a slide member for adjusting the amount of venting through the sidewall structure openings. Also provided is a method of storing food within a food tray to be contained in a heated compartment.

12 Claims, 9 Drawing Sheets

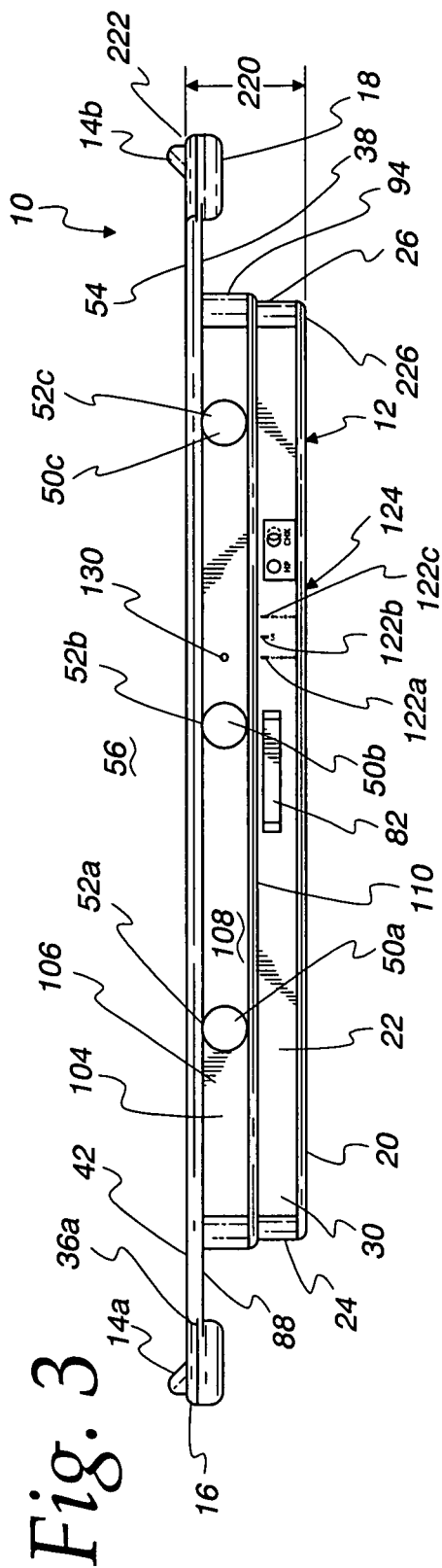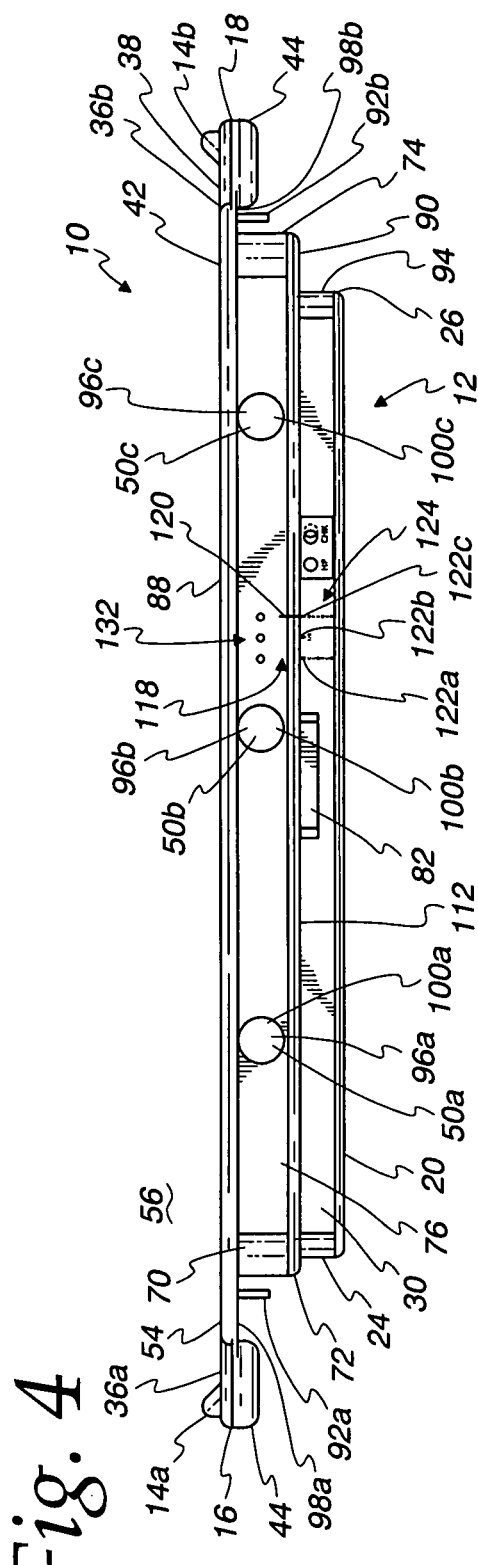

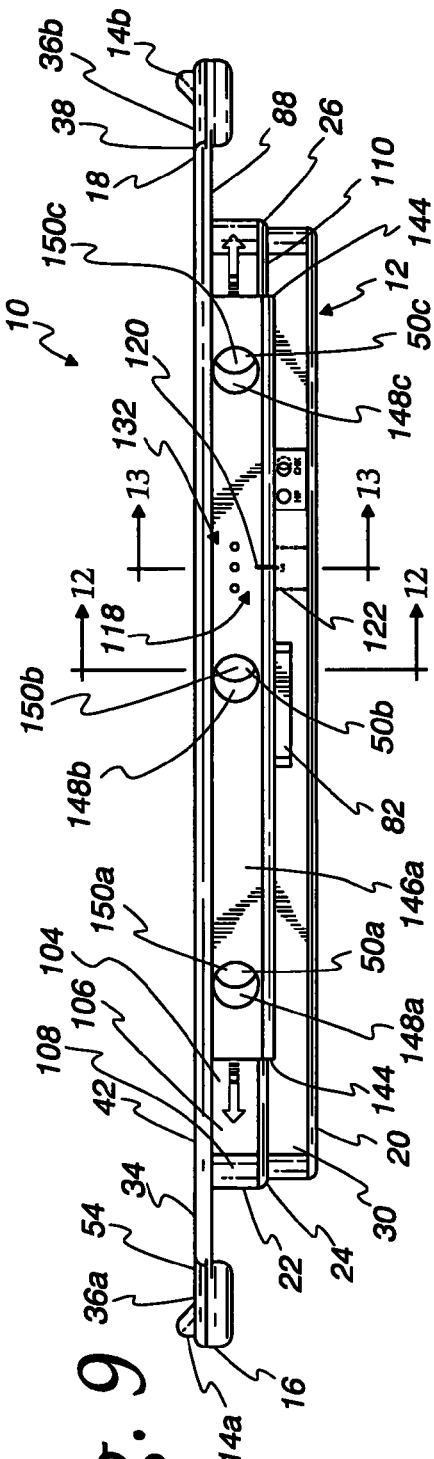

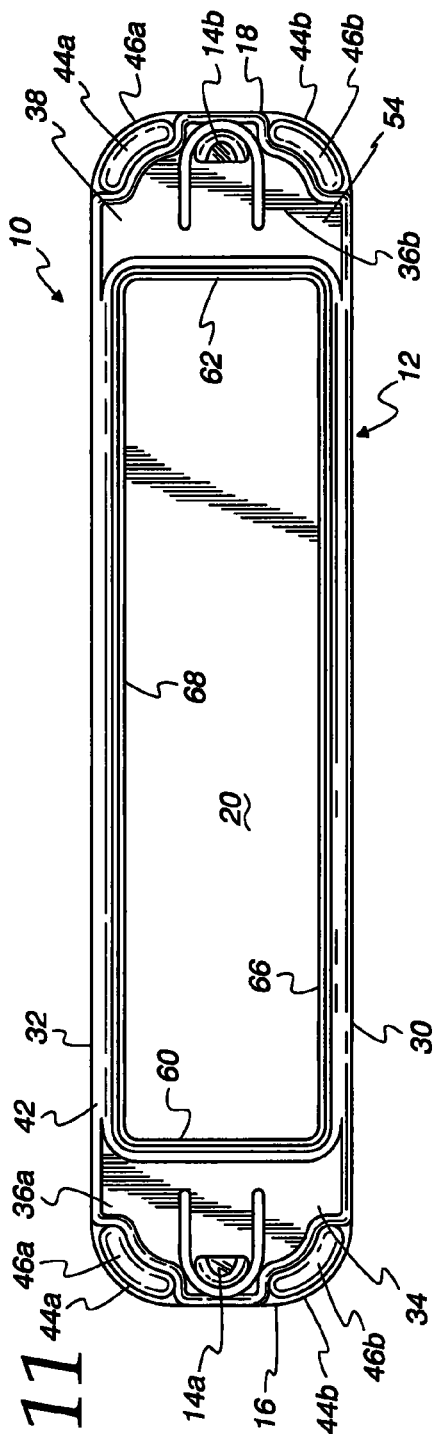
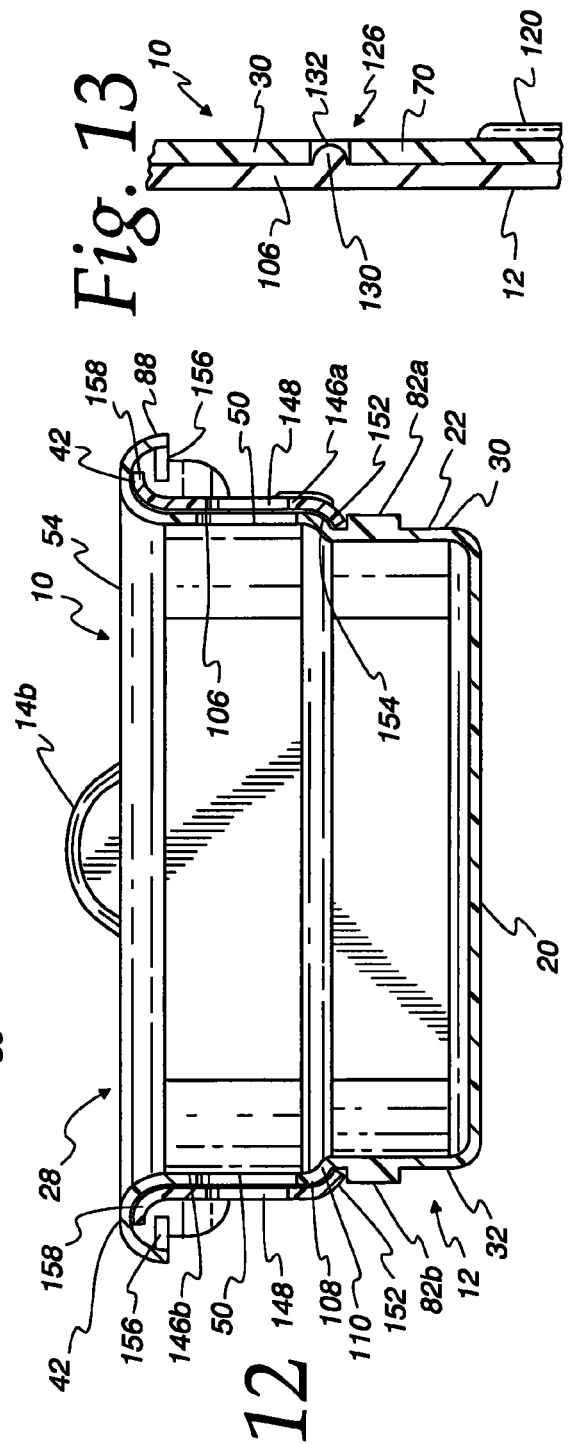
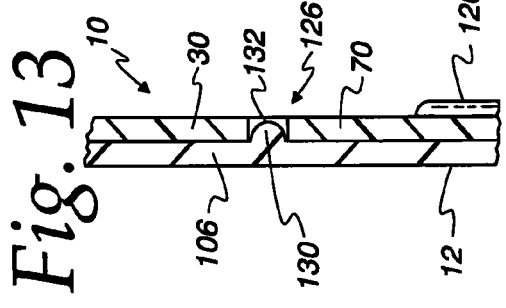

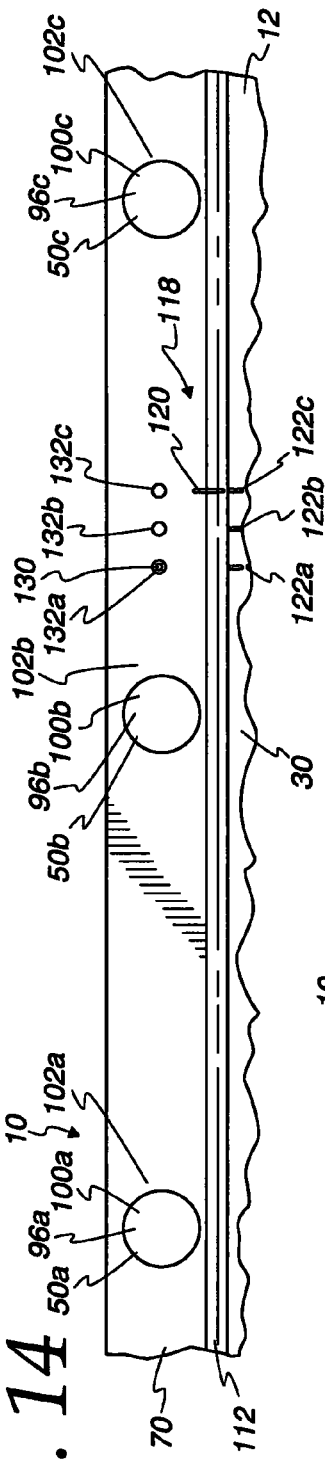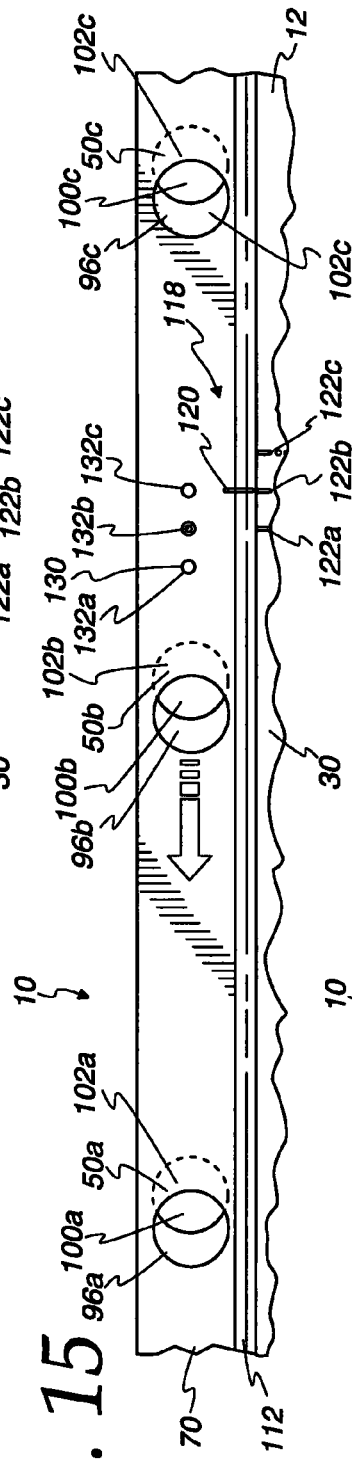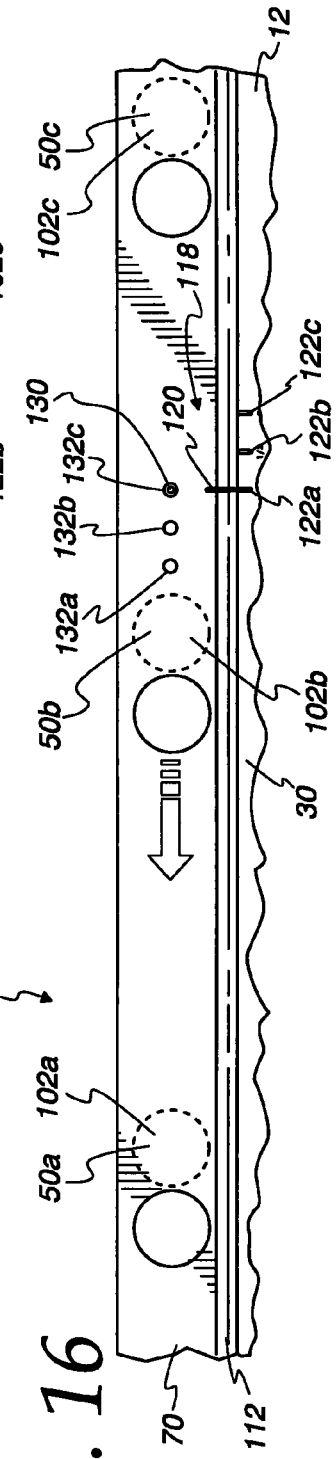

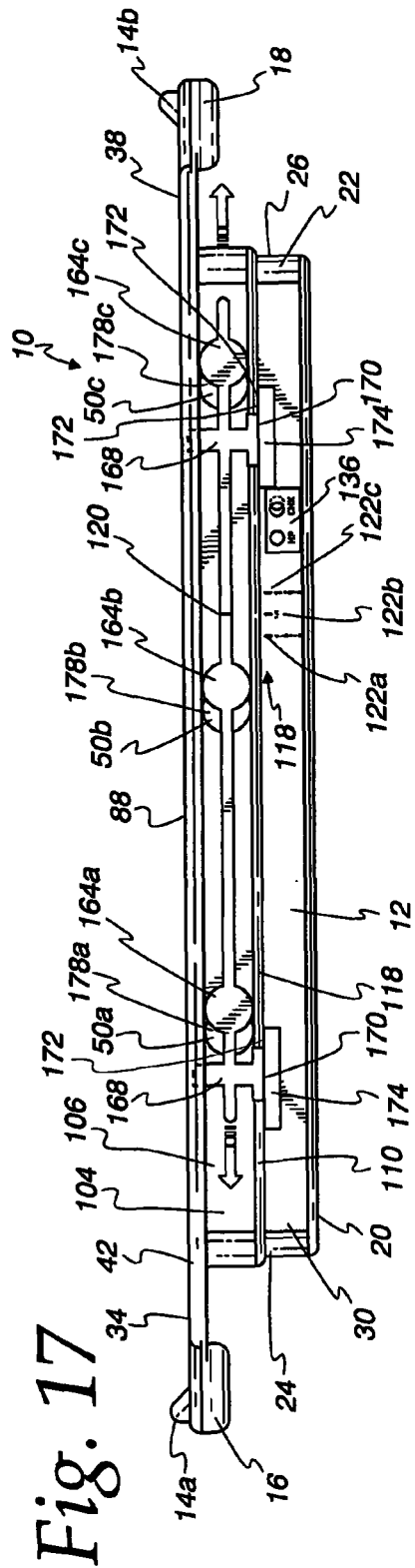
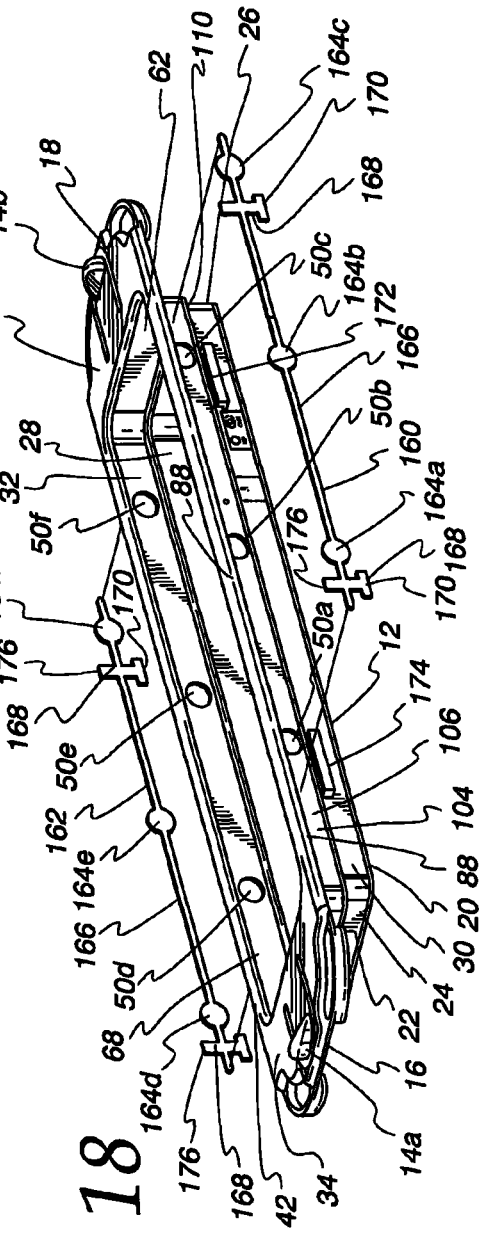
Fig. 17
Fig. 18

FOOD TRAY AND METHOD

FIELD OF THE INVENTION

This invention relates to a food tray and method for storing cooked food portions at elevated temperatures. The food tray of the present invention is particularly suited for use in, for example, heated compartments used in quick service restaurants to store cooked food product.

BACKGROUND OF THE INVENTION

Quick service restaurants face a number of conflicting factors when striving to efficiently provide fast, palatable, and safe food. Customers expect to receive their food quickly, with a minimum of delay, but also with predictable and consistent high quality. Moreover, the rate of customer demand varies over time, with some periods, such as lunch and dinner times, having extremely high rates of customer demand. However, the kitchens of many quick service restaurants are of limited size, personnel and/or production capacity and thus necessarily have a limited number of food cooking devices.

To meet the often competing factors of quick service and consistent high quality, it is advantageous for one individual to cook a relatively substantial amount of food product in bulk and store the cooked food product in food trays while another individual food preparer transfers food from the trays to a sandwich bun which may be part of a sandwich assembly procedure or to an individual portion sized container, for example, to fill customer orders. Typical food products that are of most interest to have readily available for food preparers include sandwich fillings such as hamburger patties, breaded fish fillets, Canadian bacon, pork sausage, eggs, and breaded chicken patties, as well as other food products such as chicken nuggets, biscuits, muffins, and hotcakes.

Because these prepared food products are not being served immediately upon preparation, it is critical to store the food product so as to optimally maintain the appearance, taste, temperature and texture of the food product, as well as minimize bacterial contamination of the stored food product.

A need exists for an improved food tray and a method of using the food tray that improves, preferably without any significant adverse effects, the appearance, taste, temperature and/or texture of the pre-cooked bulk food products, as well as minimizes bacterial contamination of such stored food products. In addition, a need also exists for a food staging device that promotes efficient food handling and use of space within the kitchen of the quick service restaurant.

SUMMARY OF THE INVENTION

In accordance with the present invention, an improved food tray and a method for use of a food tray typically in connection with a heated compartment, and preferably in a heated pass-through compartment, for holding ready-to-serve food products are provided. When used in combination with a compartment of desirable configuration, the food tray is particularly useful for storing over an extended period of time cooked sandwich fillings such as hamburger patties, fish fillets, Canadian bacon, pork sausage, eggs, and chicken patties, chicken fillets as well as other types of food, including, for example, chicken nuggets, biscuits, muffins, and hotcakes. The appearance, taste, temperature and texture of the stored food items may be maintained over extended storage periods while also minimizing risk of bacterial contamination.

In one aspect of the invention, an apparatus is provided which is suitable for holding previously cooked food portions at elevated temperature in a compartment for receiving the apparatus. The apparatus includes a tray having an enclosed bottom and a sidewall structure defining, in conjunction with the bottom, an interior volume for containing the previously cooked food portions. The sidewall structure has at least one sidewall opening that provides an air passageway therethrough for venting the interior volume of said apparatus. Preferably, at least one opening is provided in each of a pair of opposed sidewalls of the tray.

In accordance with another aspect of the invention, each of the at least one sidewall openings has a cross-sectional area and the total cross-sectional area of the sidewall openings consists of the sum of the cross sectional areas of all of the one or more openings in the sidewall structure of the apparatus. The apparatus has a ratio of the total cross-sectional sidewall opening area in square inches to the interior volume of the tray in cubic inches of from about 1:2100 to about 1:13.

In accordance with yet another aspect of the present invention, each of the at least one sidewall openings has a cross-sectional area and the total cross-sectional area of the sidewall openings consists of the sum of the cross sectional areas of all of the one or more openings in the sidewall structure of the apparatus. The apparatus has a ratio of the total cross-sectional sidewall opening area in square inches to the interior volume of the tray in cubic inches of from about 1:140 to about 1:40.

In accordance with still another aspect of the present invention, the sidewall structure comprises first and second end walls and first and second sidewalls, wherein the at least one sidewall opening is present in each of said first and second sidewalls.

Additionally, the apparatus may include a plurality of spaced apart sidewall openings in each of said first and second sidewalls.

In accordance with another embodiment of the present invention, the apparatus includes structure for effectively adjusting the size of at least one of the openings of the sidewall structure by partially or completely covering them.

In accordance with still another aspect of the present invention, the apparatus includes a slide member that is adjacent the sidewall structure and is mounted to the tray for sliding movement to selectively cover at least a portion of one opening in the sidewall structure. Preferably, the slide member simultaneously adjusts all the openings in the sidewall structure and selectively can cover the openings in an amount ranging from 0% to 100%.

In accordance with still another aspect of the present invention, the apparatus includes a choke member for effectively adjusting the size of an opening of a sidewall structure by covering all or a portion of the opening.

In accordance with still another aspect of the present invention, the apparatus includes a locking mechanism for selectively locking the choke member in at least one position relative to a sidewall opening.

Additionally, the apparatus includes a position indicator for indicating the position of the choke member relative to an opening. Preferably, the indicator includes indicia indicating a recommended setting of the choke member based on the food type held in the apparatus.

In accordance with another embodiment of the present invention, the apparatus holds previously cooked food portions at an elevated temperature and includes at least one heated doorless compartment for holding the food portions. The compartment has an upper compartment surface. The apparatus has a cabinet defining a volume for housing said at least one compartment therein. The cabinet includes at least one opening for inserting and removing the previously cooked food portions into and out of the compartment. The apparatus also includes at least one tray that has tray interior space having a volume for containing the previously cooked food portions. The tray is placeable into the compartment. The tray has an enclosed bottom and a sidewall structure that defines, in conjunction with the bottom, an interior volume for containing the previously cooked food portions. At least one sidewall opening is provided through the sidewall structure of the tray to provide an air passageway therethrough for venting the interior volume of the tray. The tray is oriented and supported in the compartment so that the bottom of the tray is substantially horizontal, with the top edge of the tray being spaced from the upper compartment surface.

In accordance with another aspect of the present invention, a method of storing previously cooked food is provided. The method includes placing the cooked food in a tray to at least partially fill the volume of the tray. The tray has a volume, a top edge that defines an open top, and an upwardly extending sidewall structure. The sidewall structure has one or more openings. The tray is placed and stored with the cooked food therein in a heated compartment to maintain the temperature of the food in a desired elevated temperature range. The interior of the tray is vented through the opening in the sidewall structure of the tray during the storage of the tray and cooked food contained therein in the compartment.

In accordance with another aspect of the present invention, a method of storing previously cooked food is provided. The method includes placing the cooked food in a tray to at least partially fill the volume of the tray. The tray has a volume, a top edge that defines an open top, and an upwardly extending sidewall structure. The sidewall structure has one or more openings extending therethrough. The tray is placed and stored with the cooked food therein in a heated compartment to maintain the temperature of the food in a desired elevated temperature range. The interior of the tray is vented through the opening in the sidewall structure of the tray during the storage of the tray and cooked food contained therein in the compartment. Each of the at least one sidewall openings has a cross-sectional area and the total cross-sectional area of the sidewall openings consists of the sum of the cross sectional areas of all of the one or more openings in the sidewall structure of the tray. The method additionally includes providing the tray with a ratio of the total cross-sectional sidewall opening area in square inches to the interior volume of the tray in cubic inches of from about 1:2100 to about 1:13.

In accordance with another aspect of the present invention, a method of storing previously cooked food is provided. The method includes placing the cooked food in a tray to at least partially fill the volume of the tray. The tray has a volume, a top edge that defines an open top, and an upwardly extending sidewall structure. The sidewall structure has one or more openings extending therethrough. The tray is placed and stored with the cooked food therein in a heated compartment to maintain the temperature of the food in a desired elevated temperature range. The interior of the tray is vented through the opening in the sidewall structure of the tray during the storage of the tray and cooked food contained therein in the compartment. Each of the at least one sidewall openings has a cross-sectional area and the total cross-sectional area of the sidewall openings consists of the sum of the cross sectional areas of all of the one or more openings in the sidewall structure of the tray. The amount of the cooked food to be placed in the tray may be determined by the weight of the food. The tray typically has a ratio of the total cross-sectional sidewall opening area in square inches to the weight of the food placed in the tray in pounds of from about 1:30 to about 1:0.2. Preferably, this ratio is from about 1:5 to about 1:0.7 and more preferably about 1:1.35.

In accordance with another aspect of the present invention, a method of handling cooked food to be incorporated into a sandwich in a restaurant is provided. The method comprises placing the cooked food in a tray having an open top, an enclosed bottom and a sidewall structure that defines, in conjunction with the bottom, an interior volume for the tray for containing the previously cooked food portions. The tray has at least one sidewall opening in the sidewall structure of the tray for providing an air passageway therethrough for venting the interior volume of the tray. The tray is placed and stored for a desired period of time with the cooked food therein in a heated compartment. The heated compartment has an upper surface to maintain the temperature of the cooked food in a desired elevated storage temperature range. The tray is maintained during storage so that the top edge of the tray is in the range of between about zero and 0.09 inches below the upper surface to restrict water vapor from evaporating from the cooked food during storage from the open top of the tray while in the compartment. The interior of the tray is vented through openings in the sidewall structure during the storage of the tray. Thereafter, the cooked food is removed from the tray when needed for assembly into a sandwich.

Other advantages and features of the invention will become apparent from the following description and from reference to the drawings.

BRIEF DESCRIPTION OF THE DRAWINGS

FIG. 3 is a side elevation view of the food tray of FIG. 1 that is used alone in one aspect of the present invention and used in conjunction with a slide member in other aspects of the present invention;

FIG. 4 is a side elevation view of the food tray and slide member of FIG. 1;

FIG. 9 is a side elevation view of the aspect of the tray apparatus of the present invention shown in FIG. 8;

FIG. 10 is an end view of the tray apparatus shown in FIG. 8;

FIG. 11 is a top plan view of the tray of the present invention;

FIG. 12 is a sectional view of the food tray apparatus along line 12-12 of FIG. 9 showing a slide member mounted on the tray in accordance with one aspect of the invention;

FIG. 13 is a fragmentary sectional view of the food tray apparatus along line 13-13 of FIG. 9 showing a slide member when locked in a selected position by a detent on the tray cooperating with a recess of the slide;

FIG. 14 is a fragmentary side elevation view of the tray apparatus with the slide member moved to a fully opened position with the slide bar apertures fully aligned with the sidewall openings;

FIG. 15 is a fragmentary side elevation view of the tray apparatus with the slide member moved to a partially opened position with the slide bar apertures partially aligned with the sidewall openings;

FIG. 16 is a fragmentary side elevation view of the tray apparatus with the slide member moved to a fully closed position with the slide bar apertures unaligned with the sidewall openings;

FIG. 17 is a side elevation view illustrating another aspect of the present invention having another alternative slide member including regions that are moveable to choke the sidewall openings to adjust the size of the sidewall openings on a side of the tray;

FIG. 18 is an exploded perspective view of the tray apparatus of FIG. 17, showing that the alternative slide members are mounted to both sides of the tray;

DETAILED DESCRIPTION

Figure 1:
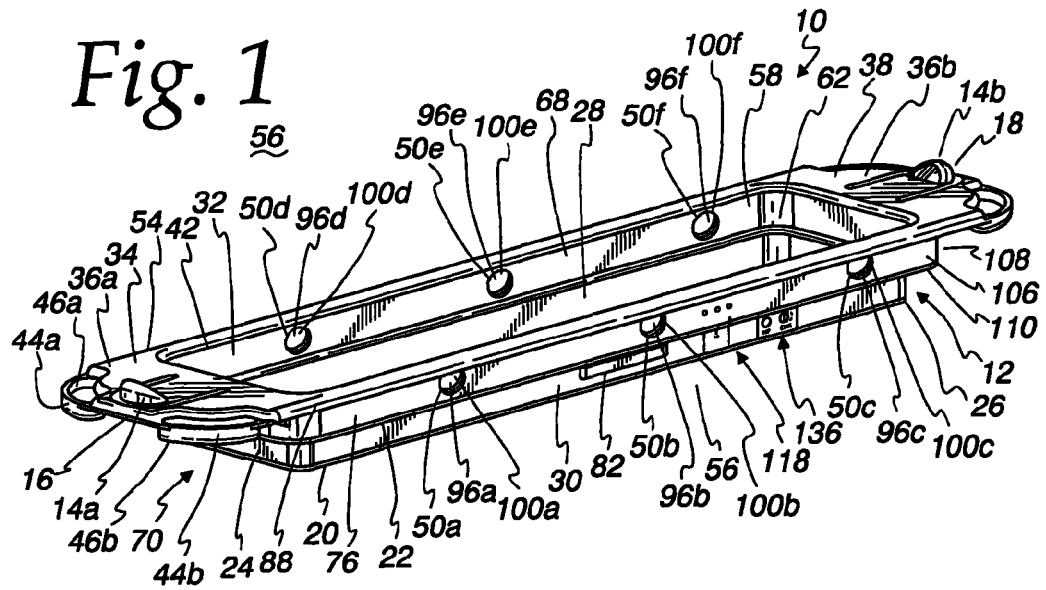
FIG. 1 is a perspective view illustrating a food tray apparatus including a food tray and a mounted slide member in accordance with the present invention.

While this invention is susceptible of embodiment in many different forms, there are shown in the drawings and described in detail herein, several specific embodiments with the understanding that the present disclosure is to be considered as exemplifications of the principles of the invention and is not intended to limit the invention to the embodiments illustrated.

Figure 2:
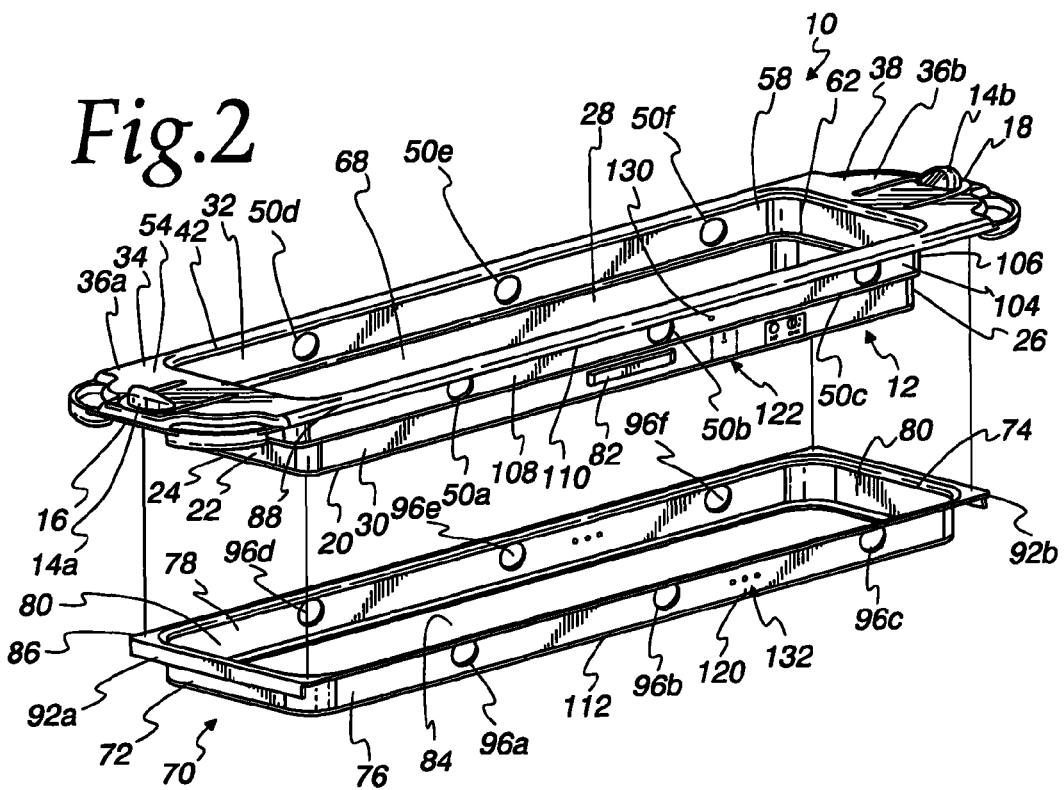
FIG. 2 is an exploded perspective view of the food tray apparatus showing the food tray and slide member of FIG. 1.

Referring to the figures generally, and as best seen in the upper portion of FIG. 2 and FIG. 3, a food tray 10 according to the present invention is shown generally as having a tray body 12 and optional movable stop members 14a,b. Tray body 12 includes a first tray end 16, a second tray end 18, a bottom 20, and a sidewall structure 22. Sidewall structure 22 includes a first end 24 and a second end 26, and a first side 30 and a second side 32 extending between ends 24 and 26. Bottom 20 and sidewall structure 22 define an interior space or volume 28 within tray body 12 wherein food items can be placed and held. Tray 10 is preferably integrally formed from plastic, such as polycarbonate having a low heat capacity for ease of handling by a person, but alternatively may be formed from any other suitable food-safe material.

Typically, tray body 12 also includes a first longitudinal extent 34 depending from first end 16 which defines a handle 36a for tray body 12, and a second longitudinal extent 38 depending from second end 18. Second longitudinal extent 38 may also define a handle 36b for tray body 12. Preferably, first longitudinal extent 34 and second longitudinal extent 38 are each generally horizontally disposed on tray body 12, such that food tray 10 can be easily maneuvered in and out of a compartment having substantially planar upper and bottom surfaces, as will be discussed in greater detail below. Additionally, food tray 10 typically includes a lip 42 which extends substantially around the entire periphery of tray body 12, including first longitudinal extent 34 and second longitudinal extent 38. Each of handles 36a,b preferably include depressed peripheral areas 44a,b, respectively, which define gripping portions 46a,b, respectively. As shown in FIG. 11, each of handles 36a,b preferably includes two depressed areas 44a,b which define gripping portions 46a,b, respectively.

Sidewall structure 22 also has one or more openings 50a-f. Each of openings 50 provides a venting passageway 52 between tray interior space 28 and the exterior atmosphere 56 of tray 10. Typically, one to five openings 50 are located in each of first side 30 and second side 32 of sidewall structure 22. As illustrated in the figures, three openings 50 are positioned in a spaced relationship along the length of each of sides 30, 32. By spacing openings 50 along the sides 30, 32, various regions within interior space 28 are all relatively proximate to one of openings 50. Additionally, each of openings 50 preferably is of approximately the same size, and the same number of openings 50 appears on each of sides 30, 32. This arrangement provides relatively uniform venting for all regions of interior space 28. Thus, the below described advantages resulting from venting through openings 50 are relatively uniformly provided for all food stored in tray 10, regardless of the location in tray 10 at which the food is placed. Typically, openings 50 are circular in shape and have about the same diameter. Preferably, this diameter is in range of about 5/16 inch to about 1¼ (5/4) inches, to provide a total cross-sectional opening area in the range of about 0.3 square inches to about 4.9 square inches for each opening 50. As an alternative, openings 50 may be of a non-circular shape, preferably the cross-sectional area of each of such openings is also in about the same range of about 0.3 square inches to about 4.9 square inches. Openings 50 are preferably also spaced upwardly from tray bottom 20 so that any juices that may escape from food contained within tray 10 do not leak out of an opening 50. Openings 50 are also positioned downwardly from the top surface 54 of tray 10 to maintain structural integrity of tray body 12. The openings can be in any desired configuration, including as a slit opening extending along the length or a portion of the length of the tray sidewall.

In a typical quick service restaurant, cooked food items, such as hamburger patties, are placed in a tray and then stored in a food holding heated storage device until used to make sandwiches. Typically, an open top tray is desired to allow convenient removal of a hamburger patty to meet the speed demands of a quick service restaurant. During storage, the cooked food tends to progressively lose desired juice and taste properties as the atmosphere of interior 28 is vented out the open top 58 of the tray. Known approaches to reduce the rate of the loss of juice and taste properties of the food product have included limiting the amount of venting of tray interior volume 28, in particular venting from the open top 58 of the tray. As discussed later in greater detail, it was now unexpectedly found that a limited amount of venting through sidewall structure 22 in accordance with the present invention does not increase the rate of loss of desired food quality, but instead acts to maintain superior taste quality for food held in tray 10 for extended periods of time, such as about 60 minutes or more for cooked hamburger patties, for example, stored at 160° F.

More specifically, the desired food quality retention can be accomplished in accordance with the present invention by providing sidewall openings 50 that have a total cross-sectional area (i.e. the sum of the total cross-sectional area of all sidewall openings 50) that is selected in relationship to (i) the volume of interior space 28, (ii) the inner surface area of sidewall structure 22 and/or (iii) the weight of the food that is maintained in tray 10.

In regard to the relationship to the volume of interior space 28, preferably the ratio of the total cross-sectional area of openings 50 in square inches to the volume of interior space 28 in cubic inches will be in the range of from about 1:2100 to about 1:13; more preferably the ratio is in the range of from about 1:140 to about 1:40; and most preferably the ratio is about 1:90. In regard to the relationship to the cross-sectional area of the inner surfaces of sidewall structure 22, the ratio of the total cross-sectional area of openings 50 to the surface area of sidewall structure 22 preferably are in the range of about 1:120 to 1:7, more preferably the ratio will be in the range of about 1:80 to about 1:20; and most preferably the ratio is about 1:50. The surface area of sidewall structure 22 for the above ratio is the inner surface area of sidewall structure 22, i.e., the sum of the areas of inner surfaces 60 and 62 of ends 24, 26, respectively, and inner surfaces 66, 68 of sides 30, 32, respectively. In regard to the relationship to the weight of food such as meat held in tray 10, the ratio of the total cross-sectional area of openings 50 in square inches to the weight of the food held in tray 10 in pounds, preferably will be in the range of about 1:30 to about 1:0.2, more preferably the ratio will be in the range of about 1:1.85 to about 1:0.5, and most preferably the ratio is about 1:1.35.

In another aspect of the present invention food tray apparatus 10 is modified to allow adjustment of the amount of venting through sidewall structure 22. FIGS. 1, 2, 4 and 10 illustrate a choke or slide member 70 mounted to tray 10 for reciprocal back-and-forth movement relative to tray 10, to thereby allow adjustment of the amount of air flow through openings 50. Slide member 70 may be formed of a unitary construction and may be molded of the same plastic or other food-safe material that is used to form tray 10. Alternatively, slide member 70 may be formed in two or more parts that are securely joined together.

Slide member 70 has a first end 72, a second end 74, a first side 76 and a second side 78 that together provide an inner perimeter surface 80 which defines a mounting opening 84. Mounting opening 84 is configured and sized to correspond to the upper portion of outer perimeter surfaces 94 of tray 10 along which slide member 70 is slideably mounted. Mounting opening 84 is made somewhat longer than the length of sidewall structure sides 30, 32 to provide clearance space for longitudinal movement relative to tray 10.

To mount slide member 70 to tray 10, slide member sides 76, 78 are manually spread apart to temporarily provide clearance over slide supports 82. Slide supports 82 may be integrally formed with sidewall structure sides 30, 32, respectively, and outwardly protrude from sides 30, 32, respectively. Slide 70 is inserted over the sidewall structure 22 of tray body 12, until the top surface 86 of slide 70 abuts against the bottom surfaces of extents 34, 38 and with slide sides 76, 78 having cleared supports 82. Slide member sides 76 and 78 are then released from their spread-apart position to slideably secure slide member 70 on tray body 12. In addition to securing slide member 70, supports 82 act as guides along which slide member 70 can slide. Tray lip 42 may also include a downwardly extending flange 88 to direct slide member 70 into proper alignment during mounting, and to additionally guide slide member 70 as it is longitudinally slid relative to tray body 12 during operation of tray 10.

A mounted slide member 70 has a variable clearance gap 90 between inner perimeter 80 of slide member 70 and sidewall structure end 24, 26 to allow slide member 70 to be moved longitudinally along tray body 12. In FIG. 4 slide member 70 is shown having been moved to the rightward end of its stroke with clearance gap 90 provided between inner slide surface 80 at slide end 74 and the outer surface 94 at second end 26 of sidewall structure 22. As slide member 70 is moved in the opposite direction of its stroke, the size of gap 90 is progressively reduced to zero. Typically, slide member 70 is moved by pushing or pulling on handles 92a,b of slide member 70.

Slide member 70 has apertures 96a-f through slide member sides 76 and 78. As slide member 70 is moved back and forth through its stroke, the position of apertures 96a-f relative to sidewall structure openings 50a-f, respectively, is changed to thereby adjust the amount of venting of tray interior space 28 through sidewall openings 50. FIGS. 14-16 illustrate the relative positioning of openings 50 and apertures 96 for three of the plurality of positions to which slide member 70 may be moved. In FIG. 14, slide member 70 has been moved to a position where apertures 96 *a-c* are substantially fully aligned with openings 50-*a-c*. The fully opened position shown in FIG. 14 provides a maximum effective opening for passageways 100 that vent interior space 28 to exterior atmosphere 56 of tray 10. FIG. 15 shows slide member 70 moved to a partially closed/partially opened position. In this position, regions 102a-c of the surface of slide member 70 have been repositioned to overlie openings 50a-c, respectively, to thereby partially choke off the effective cross-sectional area of passageways 100a-c. FIG. 16 illustrates slide member 70 after movement to a substantially fully closed position, where regions 102a-c of slide member 70 overlie openings 50a-c so as to block and substantially seal openings 50a-c.

Preferably, slide member 70 provides a simultaneous and equivalent size adjustment of all passageways 100, including both passageways 100a-c on one side of tray 10 and passageways 100d-f on the other side of tray 10. This can be accomplished by locating openings 50 and apertures 96 in an arrangement such that when slide member 70 is mounted to tray body 12, openings 50 and apertures 96 are spaced a like distance apart. Stated another way, the locations for the center points of openings 50a-f and the center points of apertures 96a-f are chosen so as to provide for a substantially equal distance between the respective center points of openings 50a-f and apertures 96a-f when slide member 70 has been mounted to tray 10. This arrangement allows all of passageways 100a-f to be simultaneously fully closed, fully opened, or variably opened the same percentage amount as slide member 70 is moved through its stroke.

Openings 50 and apertures 96 are preferably also arranged to provide convenient positioning of slide 70. In this arrangement, passageways 100 are caused to be in the fully opened position when the stroke of slide member 70 is terminated in a first direction, and providing for a fully closed position for passageways 100 when the stroke of slide member 70 is terminated during movement in the opposite direction. Stated another way, when slide member 70 is moved to a position where slide member first end 72 abuts tray sidewall structure first end 24 to terminate further movement in that direction, openings 50a-f and apertures 96a-f are fully aligned and passageways 100a-f are fully opened. When slide member 70 is moved the full extent in the opposite direction to a point where second slide end 74 abuts tray sidewall structure second end 26, openings 50a-f and apertures 96a-f are fully unaligned, i.e., slide member 70 is at the fully choked position, substantially closing off venting through openings 50a-f. Such arrangement allows a user to reliably and quickly move slide member 70 to fully opened or fully closed positions without closely inspecting the alignment of slide member apertures 96 relative to openings 50. Alternatively, the movement of the stroke of slide member 70 may be terminated by having slide member 70 contact other points on tray 10. For example, as can be appreciated by viewing FIG. 4, slide member handle 92a can abut against a stop such as the surface 98a that forms depressed area 44 to end the stroke of slide member 70 in one direction, with the stroke of slide member 70 being terminated in the other direction when slide member handle 92b abuts the surface 98b that forms depressed area 44.

As best appreciated by viewing FIGS. 3 and 10, sidewall structure 22 has an upper portion 104 that has an outwardly projecting rim 106 having an outer surface 108 with a radiused bottom edge 110. Slide member 70 has an inwardly depending radiused flange 112 having an inner surface that slideably mates with radiused bottom edge 110 of rim 106. The mating of rim bottom edge 110 and flange 112 helps prevent foreign particles from entering between slide member 70 and rim 106. Such entrance of foreign particles is undesirable because it could interfere with the sliding motion of slide member 70, or allow foreign particles to find their way into interior space 28 of tray 10 via openings 50.

Figure 6:
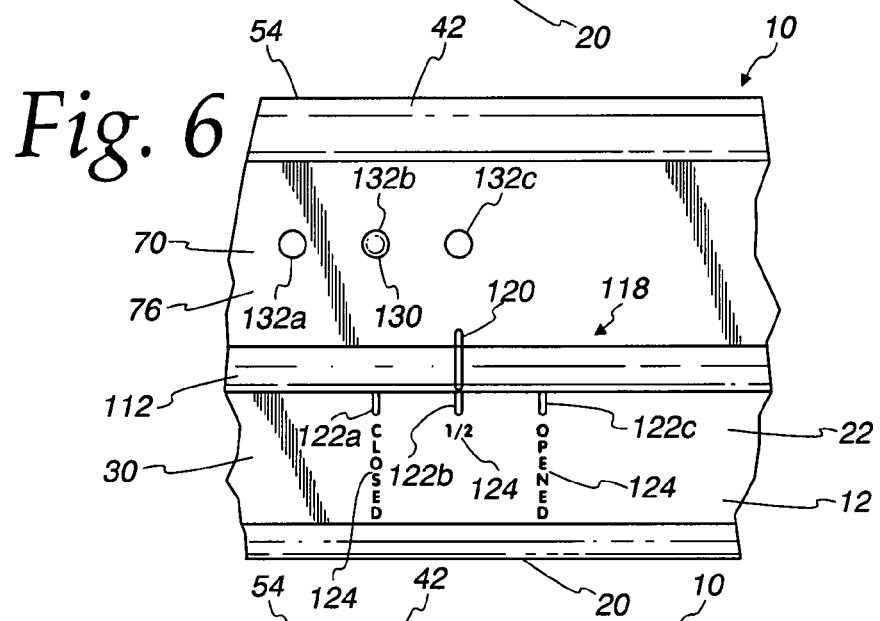
FIG. 6 is a fragmentary side elevation view illustrating another aspect of the present invention including a gauge for indicating the position of the slide bar and showing the gauge indicating the slide member is at the ½ opened position for the openings in the sidewall structure of the tray.

Another aspect of the present invention is best seen in FIG. 6, wherein the tray 10 body includes a passageway opening gauge 118 for use in setting the size of passageway openings 100 and to indicate position of slide member 70 relative to openings 50. Gauge 118 includes a mark or line 120 on slide member 70, and a plurality of spaced apart calibrated marks or lines 122a-c on tray body 12. When line 120 is vertically aligned with line 122b, slide member 70 has been moved to a predetermined partially opened condition for passageways 100, for example one-half open. When line 120 is vertically aligned with line 122a, slide member 70 has been positioned so that passageways 100 are fully closed. Vertical alignment of line 120 and line 122c indicates that slide member 70 has been positioned to the fully opened position for passageways 100.

Lines 120 and 122a-c may be integrally formed in tray body 12 and slide member 70, respectively, such as in the form of a ridge or groove, or may be provided in other manners, such as lines printed onto the surfaces of tray body 12 and slide member 70. Indicia 124 may also be provided to indicate the extent passageways 100 are open or closed, such as indicia adjacent lines 122a-c with a notation of "closed," "½," and "opened," respectively. Additional calibrated lines 122 may also be provided, if desired, to indicate additional settings for passageways 100, i.e., ¼ opened, ¾ opened, etc.

In a further aspect of the invention, tray 10 is provided with a mechanism 126 to secure slide member 70 at a selected position. As best seen by viewing FIGS. 13, 3 and 4, tray body 12 is provided with an outwardly projecting detent or lug 130, while inner surface 80 of first side 30 of sliding member 70 has three spaced apart indents or recesses 132a-c. As slide member 70 is moved to a fully opened position for passageways 100, lug 130 moves into recess 132a. In this position, lug 130 cooperates with recess 132a to secure slide member 70 at the fully opened position. This engagement prevents slide member 70 from inadvertently being moved away from the selected fully opened position during the handling of tray 10. Pushing on handles 92a or 92b with a moderate force, however, causes lug 130 to disengage from recess 132a to allow slide member 70 to be selectively moved to the partially opened position, or to the fully closed position, as desired. In the partially opened position, slide member 70 is secured in position by cooperation of lug 130 engaging recess 132b. When slide member 70 has been moved to the fully closed position, slide member 70 is maintained in position by lug 130 engaging recess 132c. Tray 10 may be provided with additional intermediate locking settings (not shown) for passageways 100 by providing additional recesses 132 positioned between recesses 132a and 132c.

Figure 7:
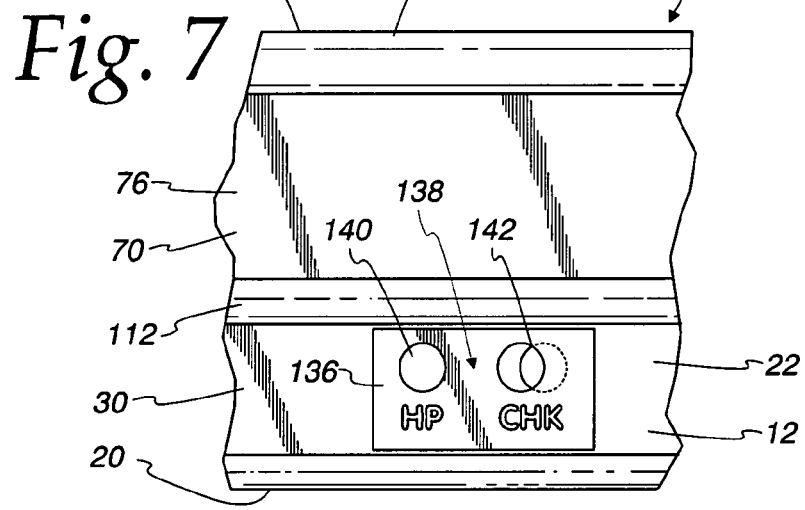
FIG. 7 is a fragmentary side elevation view illustrating another aspect of the invention including a sticker adhered to the tray body for showing recommended sidewall passageway settings for particular food types that may be stored in the tray.
Figure 8:
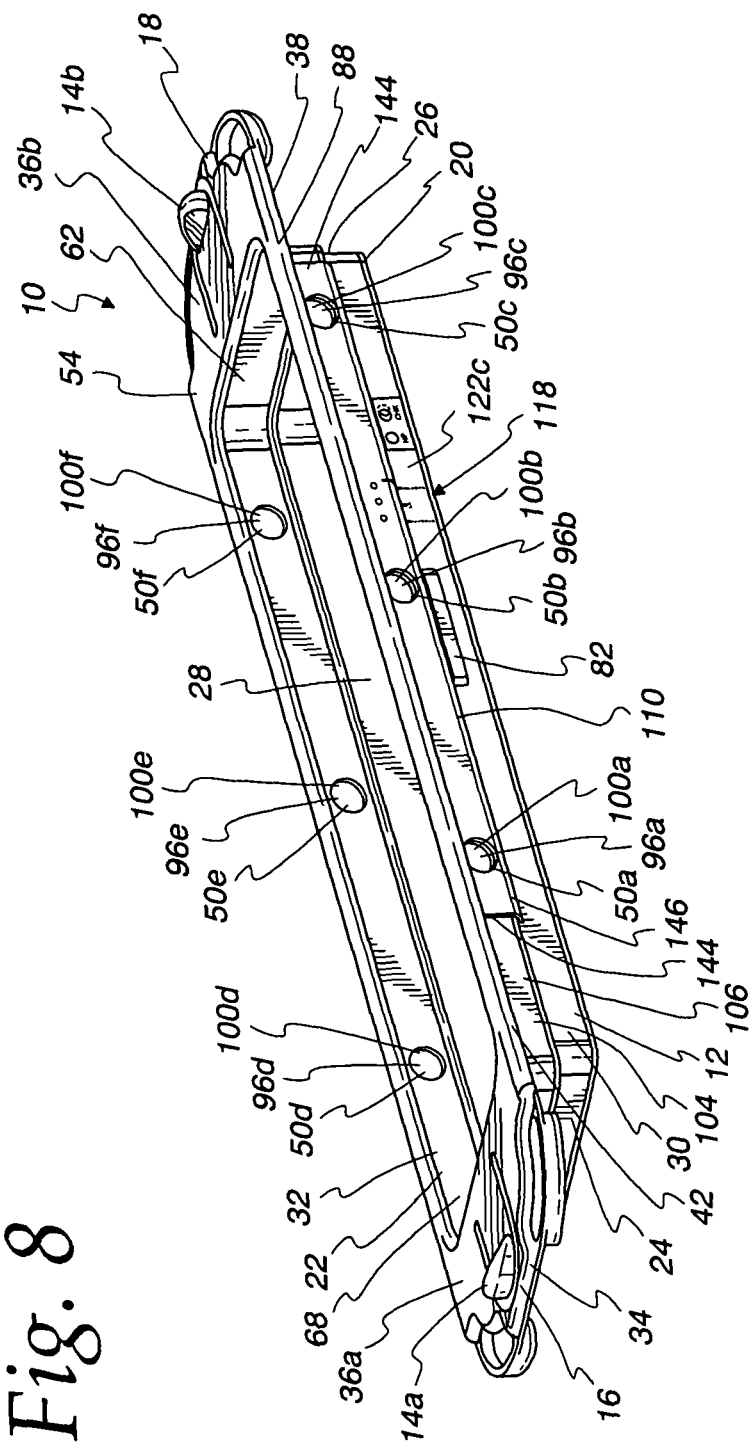
FIG. 8 is a perspective view illustrating another aspect of the present invention having an alternative slide member that is used to adjust the size of sidewall openings on a side of the tray.

A recommended setting guide 136 may also be provided to indicate recommended slide member positions based on food type to be held in tray 10. As illustrated in FIG. 7, recommended setting guide 136 may be in the form of a sticker adhered to tray body 12 or to slide member 70. Alternatively, recommended setting guide 136 may be molded integrally with tray body 12 and/or slide member 70. Recommended setting guide 136 includes indicia 138 indicating one or more food types, for example "HP" for hamburger patty and "CHK" for chicken breasts. Also included are visually readable graphical depictions 140 and 142 showing the recommended spacing of openings 50 relative to apertures 96 for a selected food type.

FIGS. 9 and 12 illustrate another aspect of the invention, wherein rather than having a single slide member 70, tray 10 has mounted thereto two separate slide members 146a and 146b. First slide member 146a has spaced apart apertures 148a-c and is mounted along first side 30 of tray sidewall structure 22 and is held in place by and supported by support 82. In similar manner of operation to that of slide member 70, slide member 146a is slideably movable to adjust the position of apertures 148a-c relative to openings 50a-c. Thus, slide member 146a may be selectively positioned to open, close or variably adjust the opening size of passageways 150a-c that vent interior space 28 of tray 10 to tray exterior atmosphere 56. Slide member 146b is positioned and supported on second side 32 of tray body 12 and functions in a similar manner to that of slide member 146a to provide adjustment of sidewall structure openings 50 on second side 32 of tray 10. As with slide member 70, alternative slide member 146 has a radiused bottom edge 152 having inner surface 154 that slideably mates with radiused bottom edge 110 of rim 106. For use in the case of slideable mounting slide member 146, tray 10 additionally includes an inwardly directed flange extension 156 to flange 88. Flange extension 156 cooperates with an outwardly directed top edge 158 on slide member 146 to slideably secure the upper portion of slide member 146 to tray 10. Slide member 146 is moved by pushing on ends 144 of slide member 146.

FIGS. 17 and 18 illustrate another alternative to the use of a single slide member 70 by the use of two separate slide members 160 and 162. Slide members 160, 162 each have an elongated generally rectangular shaped body 166 that carries three generally circular shaped choking region surfaces 164a-c and 164d-f, respectively. Slide members 160 and 162 each also include a pair of mounting members 168. Slide member 160 is slideably mounted along first side 30 of tray sidewall structure 22. When mounted, the bottom edge 170 of each mounting member 168 is slideably supported along the top surface 172 of a support 174 integrally formed on tray body 12. The top edge 176 of mounting member 168 is slideably mounted under flange 88 that downwardly depends from lip 42. Slide member 162 is mounted and supported in similar manner to second side 32 of tray body 12. In operation, slide member 160 is slideably movable to adjust the position of choking surfaces 164a-c relative to openings 50a-c to fully close or variably adjust the size of passageways 178a-c that vent interior space 28 of tray 10 to tray exterior atmosphere 56. Slide member 162 is slideable independently of slide 160 to allow movement of choking region surfaces 164d-f relative to opening 50d-f to adjust the effective size of the passageways through openings 50d-f independently of adjustment of passages 178a-c through openings 50a-c.

Figure 5:
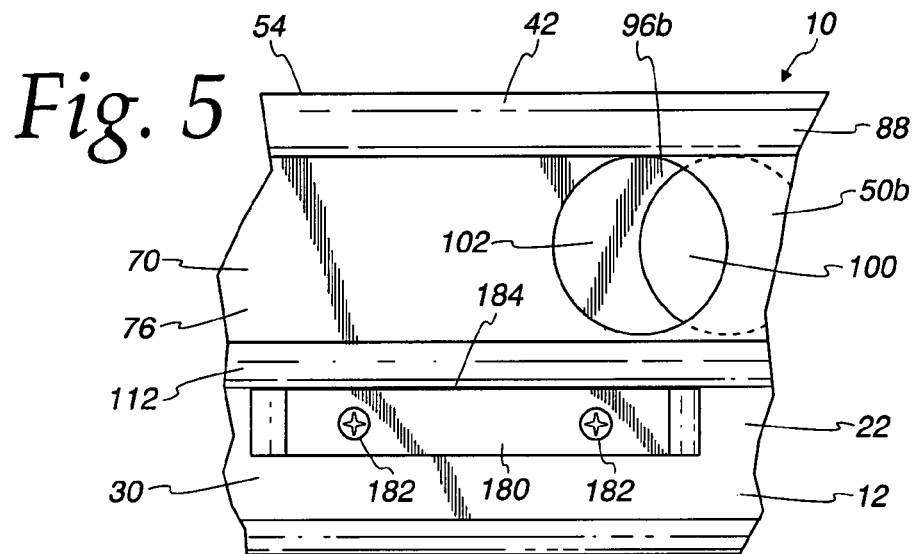
FIG. 5 is a fragmentary side elevation view illustrating an embodiment of the present invention having an alternative slide member for mounting to a side of the tray.

FIG. 5 illustrates a support 180 that can be used as an alternative to supports 82 that are formed integrally with tray body 12. Support 180 is a separate piece that can be formed of metal or plastic and attached to tray body 12 by means such as screws 182. When using support 180, slide member 70 is first positioned on tray body 12. After positioning slide member 70, support 180 is positioned on body 12 and screwed in place. Thereafter, sliding member 70 is supported for slideable movement along the upper edge 184 of support 180. One or more supports 180 may be used on each of sides 30, 32 of sidewall structure 22. One or more separately attachable supports 180 may also be used as an alternative means for supporting alternative sliding members 146, 160 or 162, rather than the use of supports 82 that are integrally formed on tray body 12.

Tray 10 is particularly useful for holding cooked food in a quick service restaurant application, where in order to meet the often competing factors of quick service and consistent high quality, it is advantageous for one individual to cook a relatively substantial amount of food product in bulk and store the cooked food product in food trays while another individual food preparer transfers food from the trays to a sandwich bun or individual portion sized container, for example, to fill customer orders. Typical food products that are of most interest to have readily available for food preparers include sandwich fillings such as hamburger patties, breaded fish fillets, Canadian bacon, pork sausage, eggs, and breaded chicken patties, as well as other products, such as chicken nuggets, biscuits, muffins, and hotcakes.

Because these prepared food products are not being served immediately upon preparation, it is critical to store the food products so as to optimally maintain the appearance, taste, temperature and texture of the food products, as well as minimize bacterial contamination of the stored food products.

Figure 19:
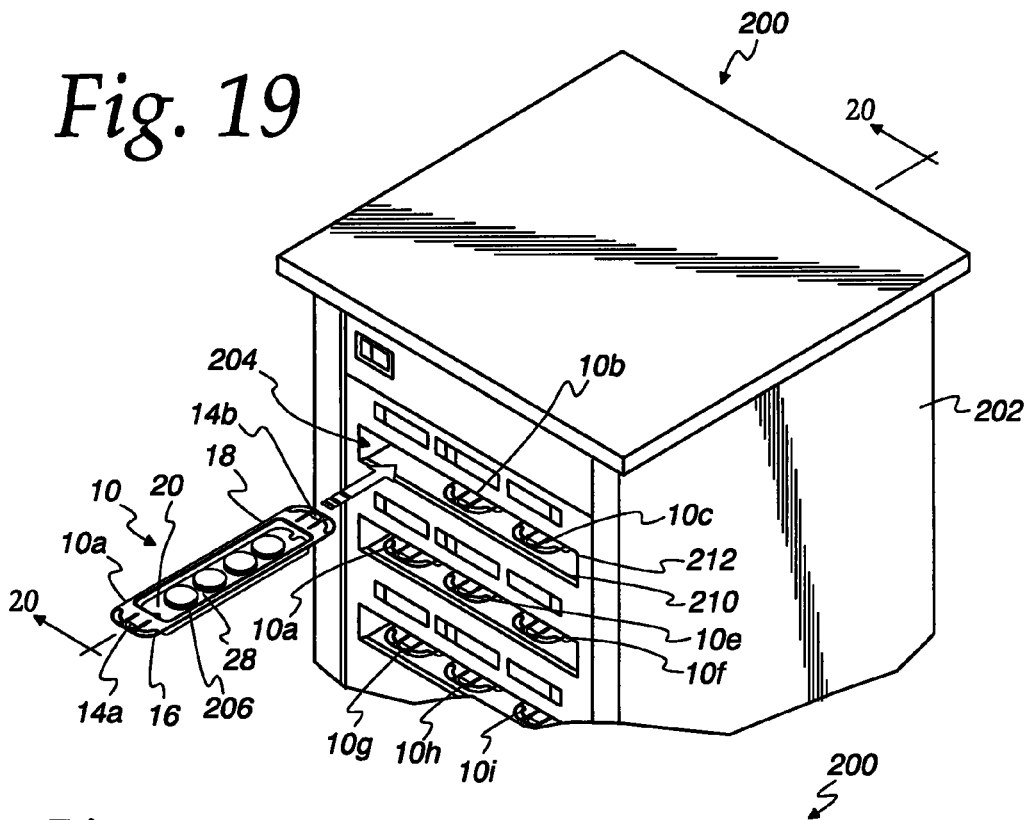
FIG. 19 is a fragmentary perspective view illustrating a tray apparatus in accordance with another aspect of the present invention containing a food product and being placed into a compartment of a food staging device that is holding other food containing trays in the compartment.
Figure 20:
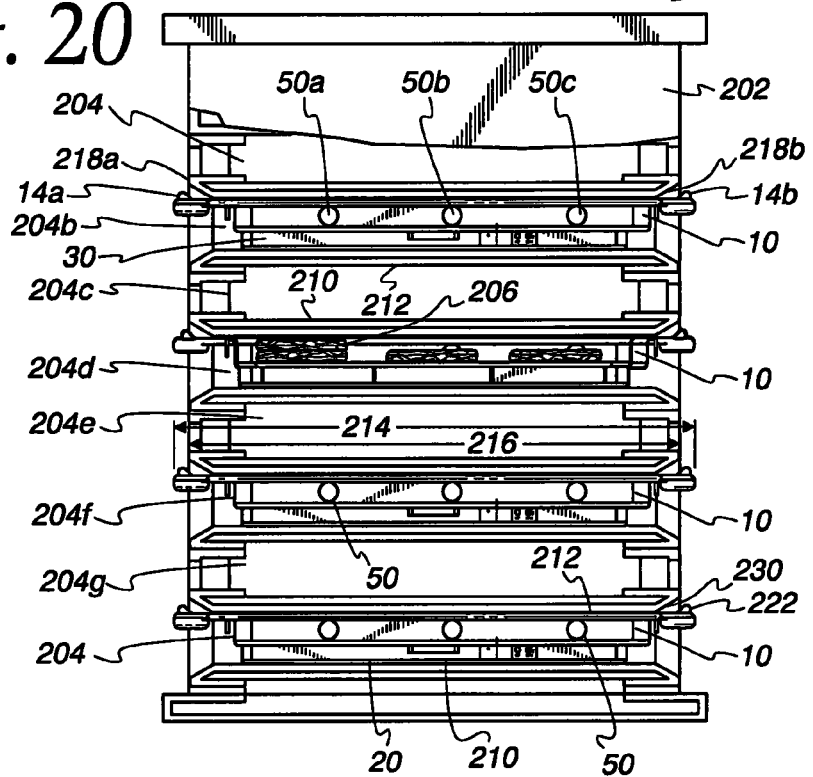
FIG. 20 is a side sectional view along the line 20-20 of FIG. 19 showing food trays positioned in pass-through compartments of the food staging device.

After cooking food products in bulk they can be placed in a tray 10 that is stored in a cabinet that preferably is maintained at an elevated temperature until the food products are later removed as needed to prepare individual orders. An exemplary food staging device 200 with which tray 10 may be used is shown in FIGS. 19 and 20 and is of the type described in greater detail in, e.g., U.S. Pat. No. 6,209,447 to Ewald et al, and assigned to Restaurant Technology Inc., the teachings of which are incorporated herein by reference. Food staging device 200 includes a cabinet 202 with a plurality of pass through doorless compartments 204 for receiving trays 10 with a cooked food placed in volume 28 of tray 10, such as hamburger patties 206. Each compartment is defined by a heated bottom surface 210 and a heated top surface 212 which can be independently heated to temperatures selected based on the type of food held in trays 10.

When a product type is selected for a particular row and column, the desired temperature set points are implemented for the corresponding lower and upper heated surfaces 210 and 212, respectively. For example, lower and upper surface temperatures in the range of about 170° F. and about 185° F., respectively, are suitable for hamburger patties 206.

Preferably, each of trays 10a-i has a width smaller than the width of compartments 204 a-i to permit placing more than one tray within a compartment, for example the three trays 10 in each compartment 204 as is shown in FIG. 19. As shown in FIG. 20, each of the trays has a length 214 that exceeds the depth 216 of compartments 204a-i, so that optional stop members 14a-b can cooperate with cabinet surfaces 218a-b, respectively, to reversibly secure trays 10 within one of compartments 204, as explained in detail in U.S. Patent Application Publication No. 2006/0045943 to Calzada et al., the teaching of which is incorporated herein by reference.

Each of lower heated compartment surfaces 210 is flat and substantially horizontal to provide uniform heat transfer to trays 10 and permit easy sliding of those trays along the surface of lower heated compartment surfaces 210. Referring also to FIG. 3, each of trays 10a-i has a height 220 defined by the distance between the upper edge 222 of the sidewall structure 22 and the lower edge 226 of sidewall structure 22 of trays 10a-i. Height 220 is chosen so that upper edge 222 of any of trays 10a-11s at a predetermined distance 230 (shown in FIG. 20) from upper compartment surfaces 212 when trays 10a-i are placed within compartments 204a-i so that vapor transfer from open top 58 out of the interior volume 28 of the trays is minimized, thereby also minimizing the fluid loss of the cooked food portions stored therein. This is important for cooked food stored in trays 10 such as egg products, hamburger patties, grilled chicken, pork sausage and Canadian bacon. Preferably for such food, the cooked food portions fill more than about 5% and more preferably about 17-50% or more of the volume 28 of trays 10 when stored in device 200. Generally, with respect to vapor loss out of the open top of tray 10, minimal vapor transfer is achieved out of the interior of the trays when distance 230 is in the range of 0-0.090 inches. Most preferably, height 220 is chosen so that the distance 230 is approximately 0.060 inches (0.125 inches for biscuits). Additional details concerning distance 230 are disclosed in U.S. Pat. No. 6,209,447.

The previously cooked food portions are held within compartments 204a-i, preferably within trays 10a-i, until sold or otherwise disposed of. Because compartments 204a-i are discrete, with well-defined upper heated compartment surfaces 212 and well-defined lower heated compartment surfaces 210, air currents throughout cabinet 202, if any, are limited. In addition, air currents within compartments 204a-i, if any, are limited because both upper heated compartment surfaces 212 and lower heated compartment surfaces 210 are heated, thereby reducing or eliminating thermal incongruities within compartments 204a-i. By restricting the air currents throughout cabinet 202 and within compartments 204a-i, device 200 reduces the amount of moisture lost out the top of tray 10 from the food portions held therein and thus protects the appearance, taste, and texture of the food portions. Evaporation of liquid from the food portions is further minimized by choosing height 220 of trays 10a-i such that upper edges 222 of trays 10a-i are at a small, predetermined distance 230, generally preferably greater than 0 and less than about 0.090 inches and most preferably 0.060 inches, from upper compartment surfaces 212 when trays 10a-i are placed within compartments 204a-i.

Since minimizing vapor loss out the open top of the container has been known to reduce fluid loss of the cooked food product stored in a tray, it would be expected that any venting of vapor out sidewall structure 22 should be avoided to reduce fluid loss of the food product. It was discovered by this invention that a controlled amount of venting through sidewall 22 provided an unanticipated result not previously known or contemplated. Surprisingly, sidewall structure venting of tray 10 in accordance with the present invention did not result in an increased fluid loss for food product held in tray 10. Rather, it was unexpectedly found that a limited venting of tray volume 28 through openings 50 of sidewall structure 22 in accordance with the invention resulted in a reduction of fluid loss from the food products and provided a superior taste and texture for food products that are maintained in tray 10 in a food staging device, such as exemplary device 200.

More specifically, a test was conducted to compare the effect of limited sidewall structure venting for cooked hamburger patties 206 held in food staging device 200. A first group of cooked hamburger patties was placed in tray 10 having sidewall structure openings 50, and the patties were stored for 25 minutes in a heated compartment 204 of a food staging device 200. A second group of cooked hamburger patties was placed in a tray otherwise identical to food tray 10 except that it did not have any sidewall openings. The tray holding the second group of hamburger patties was stored for a shorter 15 minute period in a heated compartment of a staging device 200 under approximately the same temperature and conditions used to store the first group of hamburger patties. The quality of the first group of hamburger patties was compared to that of the second group of hamburger patties immediately after the patties were withdrawn from storage in device 200. The hamburger patties from the first group that had utilized sidewall venting during storage exhibited noticeably less fluid lost and tasted juicier than the second group of hamburger patties that did not utilize sidewall venting. In addition, the two trays used to hold the first and second groups of hamburger patties were inspected after storing the hamburger patties. The second tray contained a noticeable amount of fluids that had escaped from the second group of hamburger patties during the 15 minutes they were stored without sidewall structure venting. The first tray, in comparison to the second tray, contained a considerably lesser amount of fluids that had escaped from the first group of hamburger patties during the minutes they had been stored in the tray providing sidewall structure venting.

In addition to superior juice retention and taste, the hamburger patties of the first group that were stored for 25 minutes with sidewall venting in accordance with the present invention had a superior texture compared to the second group of hamburger patties stored for only 15 minutes in a tray not providing any sidewall venting. Moreover, hamburger patties of the second group had a more rubbery texture that was not observed with the first group of hamburger patties stored in accordance with the invention.

It is not fully understood why the unexpected results of superior taste, juice retention and texture are achieved through use of the sidewall structure venting tray and method of the present invention. One possible explanation may be that venting through sidewall openings 50 reduces the amount of water vapor that accumulates in tray volume 28 after escaping from the previously-cooked hamburger patties. The decreased relative amount of trapped water vapor could result in a decreased amount of heat transferring capability for the heated tray volume 28 in which hamburger patties are stored. This reduced amount of heat transferring capability could, in turn, result in a reduction in any continued cooking or stewing of hamburger patties 206, such as that might take place in a non-sidewall structure vented tray that has a higher heat transfer capability due to a higher relative water vapor content in the atmosphere of the tray interior volume.

While providing sidewall venting in accordance with the invention provides superior food qualities, an excessive amount of sidewall venting of tray volume 28 could result in a loss of the achieved improved results. Therefore, in order to avoid excessive venting through sidewall structure 22, tray 10 is provided with openings 50 having a total cross sectional area for openings 50 that is selected as a ratio to the volume of the tray volume 28, a ratio to the sidewall structure surface area, and/or a ratio to the weight of food stored in tray 10.

In accordance with one aspect of the invention, the ratio of the total cross-sectional area of openings 50 in square inches to the tray volume 28 in cubic inches, preferably will be in the range of about 1:2100 to about 1:13, more preferably in the range of about 1:140 to about 1:40, and most preferably about 1:90.

In accordance with another aspect of the invention, the ratio of the total cross-sectional area of openings 50 to the interior surface area of wall structure 22 preferably will be in the range of about 1:1200 to about 1:7, more preferably in the range of about 1:80 to about 1:20, and most preferably about 1:50.

In accordance with another aspect of the invention, the ratio of the total cross-sectional area of openings 50 in square inches to the weight of food stored in tray 10 in pounds, preferably will be in the range of about 1:30 to about 1:0.2, more preferably in the range of about 1:1.85 to about 1:0.5, and most preferably about 1:1.35.

Regarding embodiments of the invention that include means to adjust the size of venting passageways through sidewall structure 22, the aforesaid ratios apply to the total cross-sectional area of the sidewall structure passages once such passageways are adjusted for use in storing a food. Moreover, trays 10 having adjustable passageways preferably will be adjustable to provide a total cross-sectional area of the sidewall structure passageways that includes the full range of the preferred ranges set forth above.

In regard to a tray that has predetermined passageway settings such as a setting "HP" for hamburger patties, such setting may be set to provide a preferred ratio for the total cross-sectional area to the typical weight of the food to be held in the tray. For example, if the tray is typically used to hold ten quarter-pound hamburger patties having total weight of about 2.5 pounds, the setting for "HP" would provide a total cross-sectional area for sidewall passages 100 of about 3.375 square inches. Thus, the preferred ratio of 1:1.35 square inches of effective venting cross-sectional area for sidewall structure 22 would be achieved for the 2.5 pounds of hamburger patties stored in the tray. Likewise, graphical depiction 138 of the recommended positioning of apertures 96 relative openings 50 may also be used to represent a position that provides a total cross-sectional area of openings 50 that is about the most preferred ratio for the food type and weight stored in tray 10.

During customary use, tray 10 will be moved along the direction of its longitudinal axis as it is repeatedly and rapidly inserted into and withdrawn from compartment 204, such as when tray 10 is quickly withdrawn to remove an individual hamburger patty to prepare a hamburger, and then tray 10 is quickly reinserted into compartment 204. Because of this, sidewall structure openings 50 are preferably included only in sidewall structure sides 30, 32 and not in sidewall structure ends 24, 26. This arrangement prevents excess sidewall venting during rapid movement along the longitudinal direction, and also reduces heat buildup on grip portions 46a 46b that are handled by a tray user.

In the case of a tray 10 that does not include means for adjusting the size of passageways through openings 50, such as slide member 70, certain features need not be provided for tray 10. These include gauge 118, recommended setting guide 136, slide member locking means 126, and other features useful for adjusting the size of openings 50.

While the invention has been described with respect to certain preferred embodiments, it is to be understood that the invention is capable of numerous changes, modifications, and rearrangements without departing from the scope or spirit of the invention as defined in the claims.

What is claimed is:

1. A tray for holding cooked food portions at an elevated temperature, comprising:

a bottom and a sidewall structure defining an interior volume for containing the cooked food portions, the sidewall structure comprising first and second opposed sidewalls and first and second opposed end walls;

each of the first and second sidewalls having at least one sidewall opening for providing an air passageway therethrough for venting the interior volume of the tray; and a slidable member for adjusting the size of the passageway through at least one of the openings in each of the first and second sidewalls for adjusting the amount of venting of the interior volume of the tray for optimizing the food holding efficiency of the tray, the slidable member mounted for movement along the first and second sidewalls, whereby the movement adjusts the size of the air passageway through the at least one of the sidewall openings in each of the first and second sidewalls, the slidable member having a first end proximate to the first end wall to allow the slidable member to be accessed from adjacent the first end wall to move the slidable member to adjust the size of the passageway through at least one of the openings in each of the first and second sidewalls.

2. The tray of claim 1 wherein:

the tray has a substantially open top and closed bottom; and the sidewall openings have a total cross-sectional area and the tray has a volume, the ratio of the total cross-sectional area of the sidewall openings in square inches to the interior volume of the tray in cubic inches is in the range of from about 1:2100 to about 1:13.

3. The tray of claim 1 further comprising a second end of the slidable member proximate to the second end wall to allow the slidable member to be manually accessed from adjacent each of the first and second end walls to move the slidable member to adjust the size of the passageway through the openings.

4. The tray of claim 1 further comprising:

the sidewall structure including first and second at least generally opposed sidewalls each having a plurality of the sidewall openings, and the tray has a generally open top, and the member for adjusting the size of the passageway further comprises indicia for use in indicating whether the member for adjusting is adjusted to a preselected position for holding food that is to be held in the tray.

5. The tray of claim 1 further comprising:

the slidable member for reciprocal movement that simultaneously adjusts the size of the passageway through the openings, including openings that are located in both the first and second opposed sidewalls.

6. A tray for holding cooked food portions at an elevated temperature, comprising:

a bottom and a sidewall structure defining an interior volume for containing the cooked food portions;

the sidewall structure including first and second at least generally opposed sidewalls and first and second at least generally opposed end walls with a plurality of spaced apart sidewall openings being present in each of the first and second sidewalls for providing an air passageway therethrough for venting the interior volume of the tray; and a slide member for adjusting the size of the passageway through the sidewall openings in the sidewall structure for adjusting the amount of venting of the interior volume of the tray for optimizing the food holding efficiency of the tray;

a first extent extending longitudinally from the first end wall to provide a first tray handle and a second extent extending longitudinally from the second end wall to provide a second tray handle;

the slide member having a first and second handle for reciprocally moving the slide member to a desired position to adjust the size of the passageway of each of the sidewall openings in each of the first and second sidewalls, the slide member having first and second opposite ends, the first slide member handle located at the first end of the slide member and the second slide member handle located at the second end of the slide member, the first slide member handle located proximate the first tray handle and the second slide member handle located proximate the second tray handle so that either of the first and second slide member handles can be grasped to move the slide member to a desired position to adjust the size of the passageway through each of the sidewall openings.

7. The tray of claim 6 wherein the tray having an open top and closed bottom, and closed first and second at least generally opposed end walls and further comprising indicia for indicating the slide member is adjusted to a preselected position for holding food that is to be held in the tray.

8. The tray of claim 7 wherein the indicia comprises a plurality of preselected positions wherein each position indicates that the slide member has been moved to a position to adjust the size of the passageway through the openings for holding a predetermined type and amount of food.

9. A tray for holding cooked food portions at an elevated temperature, comprising:

a bottom and a sidewall structure defining an interior volume for containing the cooked food portions;

at least one sidewall opening in the sidewall structure of the tray for providing an air passageway therethrough for venting the interior volume of the tray;

a slidable member for adjusting the size of the passageway through at least one of the openings in the sidewall structure for adjusting the amount of venting of the interior volume of the tray for optimizing the food holding efficiency of the tray, the tray having a substantially open top and closed bottom; and the sidewall structure having first and second at least generally opposed sidewalls and first and second at least generally opposed end walls, each of the first and second sidewalls having at least one of said sidewall openings;

the slidable member for reciprocal movement that simultaneously adjusts the size of the passageway through the openings, including openings that are located in both the first and second opposed sidewalls; and the slidable member is slidable back and forth along the first and second opposed sidewalls to adjust the size of the passageway through the openings, and a locking mechanism for selectively locking the slidable member in a plurality of preselected positions for the adjustment of the size of the passageways located in both the first and second opposed sidewalls.

10. A tray for holding cooked food portions at an elevated temperature, comprising:

a bottom and a sidewall structure defining an interior volume for containing the cooked food portions;

at least one sidewall opening in the sidewall structure of the tray for providing an air passageway therethrough for venting the interior volume of the tray; and means for adjusting the size of the passageway through at least one of the openings in the sidewall structure for adjusting the amount of venting of the interior volume of the tray for optimizing the food holding efficiency of the tray, wherein the sidewall structure comprises first and second opposed sidewalls and first and second opposed end walls, each of the first and second sidewalls having at least one of said sidewall openings; and, the means for adjusting comprises a slidable member mounted for movement along the first and second sidewalls, whereby the movement adjusts the size of the air passageway through the sidewall openings, the slidable member having a first end proximate to the first end wall and a second end of the slidable member proximate to the second end wall to allow the slidable member to be manually accessed from adjacent both of the first and second end walls to move the slidable member to adjust the size of the passageway through the openings.

11. A tray for holding cooked food portions at an elevated temperature, comprising:

a bottom and a sidewall structure defining an interior volume for containing the cooked food portions;

at least one sidewall opening in the sidewall structure of the tray for providing an air passageway therethrough for venting the interior volume of the tray; and means for adjusting the size of the passageway through at least one of the openings in the sidewall structure for adjusting the amount of venting of the interior volume of the tray for optimizing the food holding efficiency of the tray, further comprising:

the sidewall structure including first and second at least generally opposed sidewalls and first and second at least generally opposed end walls with a plurality of spaced apart sidewall openings being present in each of the first and second sidewalls, a first extent extending longitudinally from the first end wall to provide a first tray handle and a second extent extending longitudinally from the second end wall to provide a second tray handle;

the means for adjusting comprising a slide member having a first and second handle for reciprocally moving the slide member back and forth to adjust the size of the passageway through at least one opening in each of the first and second sidewalls, the slide member having first and second opposite ends, the first slide member handle located at the first end of the slide member and the second slide member handle located at the second end of the slide member, the first slide member handle located proximate the first tray handle and the second slide member handle located proximate the second tray handle so that, when manually grasping the tray at the first and second tray handles, the first and second slide member handles can be grasped for the back and forth movement of the slide member for adjusting the size of the passageway through the openings, further comprising the tray having an open top and closed bottom, and closed first and second at least generally opposed end walls; and the adjusting means further comprises indicia for indicating the adjusting means is adjusted to a preselected position for holding food that is to be held in the tray.

12. The tray of claim 11 wherein the indicia comprises a plurality of preselected positions wherein each position indicates that the slide member has been moved to a position to adjust the size of the passageway through the openings for holding a predetermined type and amount of food.

* * * * *

UNITED STATES PATENT AND TRADEMARK OFFICE
CERTIFICATE OF CORRECTION

PATENT NO. : 8,573,118 B2  
APPLICATION NO. : 11/906726  
DATED : November 5, 2013  
INVENTOR(S) : Henry T. Ewald et al.

Page 1 of 1

It is certified that error appears in the above-identified patent and that said Letters Patent is hereby corrected as shown below:

In the Specification

Col. 12, line 9, delete "10a-11s" and insert therefor --10a-i is--.

Col. 13, line 26, after "during the" insert --25--.

Signed and Sealed this
Twenty-fourth Day of March, 2015

Michelle K. Lee
*Director of the United States Patent and Trademark Office*